(12) United States Patent
Yuen et al.

(10) Patent No.: US 11,378,224 B2
(45) Date of Patent: Jul. 5, 2022

(54) LINER FOR INSULATING HIGH TEMPERATURE PROCESS PIPING AGAINST THERMAL FATIGUE FAILURE

(71) Applicant: Suncor Energy Inc., Calgary (CA)

(72) Inventors: Simon Yuen, Calgary (CA); Millar Iverson, Calgary (CA); Brian Tkachyk, Calgary (CA); Edmond Hung, Calgary (CA); Haixia Guo, Calgary (CA)

(73) Assignee: Suncor Energy Inc., Calgary (CA)

( * ) Notice: Subject to any disclaimer, the term of this patent is extended or adjusted under 35 U.S.C. 154(b) by 0 days.

(21) Appl. No.: 16/949,288

(22) Filed: Oct. 23, 2020

(65) Prior Publication Data

US 2021/0123559 A1 Apr. 29, 2021

(30) Foreign Application Priority Data

Oct. 28, 2019 (CA) .................................. CA 3060620

(51) Int. Cl.
*F16L 59/12* (2006.01)
*F16L 59/22* (2006.01)
*F16L 59/147* (2006.01)
*F16L 59/02* (2006.01)
*F16L 9/14* (2006.01)
(Continued)

(52) U.S. Cl.
CPC .................. *F16L 59/12* (2013.01); *F16L 9/14* (2013.01); *F16L 21/00* (2013.01); *F16L 43/00* (2013.01);
(Continued)

(58) Field of Classification Search
CPC ......... F16L 59/21; F16L 59/14; F16L 59/147; F16L 59/22
(Continued)

(56) References Cited

U.S. PATENT DOCUMENTS 3,095,220 A * 6/1963 Pierce ..................... F16L 59/21
285/302
3,372,462 A 3/1968 Reid
(Continued)

FOREIGN PATENT DOCUMENTS

DE 4431954 C1 * 11/1995 ............. F01N 13/14
EP 0701087 A1 3/1996
EP 724010 A1 * 7/1996 ............. C10K 1/043

OTHER PUBLICATIONS

Perkins, G.; "The Bellows Bottom Line—Practical advice on expansion joints"; Oakridge Bellows; May 2010.
(Continued)

*Primary Examiner* — Patrick F Brinson
(74) *Attorney, Agent, or Firm* — CPST Intellectual Property Inc.; Brett J. Slaney

(57) ABSTRACT

Provided herein is a liner that can be loosely inserted in process pipe to form a lined pipe and to decrease the rate of heat transfer between process fluids flowing through the liner and the process pipe. The liner provided herein can reduce applied thermal loading on the outer pipe resulting from, for example, turbulent mixing between fluids having different temperatures (with or without stratification), circumferential thermal gradients, and/or longitudinal thermal gradients. An annulus between the process pipe and liner can be at least partially filled by process fluids, thereby creating a thermal buffer to further decrease the rate of heat transfer between the fluids and the process pipe.

20 Claims, 7 Drawing Sheets

(51) Int. Cl.
*F16L 21/00* (2006.01)
*F16L 43/00* (2006.01)

(52) U.S. Cl.
CPC ............ *F16L 59/025* (2013.01); *F16L 59/029* (2013.01); *F16L 59/147* (2013.01); *F16L 59/22* (2013.01)

(58) Field of Classification Search
USPC .............. 138/120, 155, 114, 109, 148, 149; 285/47, 133.11, 179, 187
See application file for complete search history.

(56) References Cited

U.S. PATENT DOCUMENTS

| | | | |
|---|---|---|---|
| 3,388,724 A * | 6/1968 | Mascenik | F16L 59/141 138/149 |
| 3,492,030 A | 1/1970 | Harrison et al. | |
| 3,537,729 A | 11/1970 | Burkett | |
| 4,060,263 A * | 11/1977 | Kotcharian | F16L 59/21 138/28 |
| 4,363,504 A | 12/1982 | De Feo et al. | |
| 4,582,094 A * | 4/1986 | Stausebach | F16L 59/12 285/47 |
| 5,167,430 A * | 12/1992 | Bainbridge | F16L 27/1004 60/322 |
| 5,935,517 A * | 8/1999 | Roll | C10K 1/043 138/148 |
| 6,520,213 B1 | 2/2003 | Esser | |
| 9,927,053 B2 | 3/2018 | Conrad | |

OTHER PUBLICATIONS

Office Action dated Nov. 19, 2021 issued in related CA application No. 3,060,620.

* cited by examiner

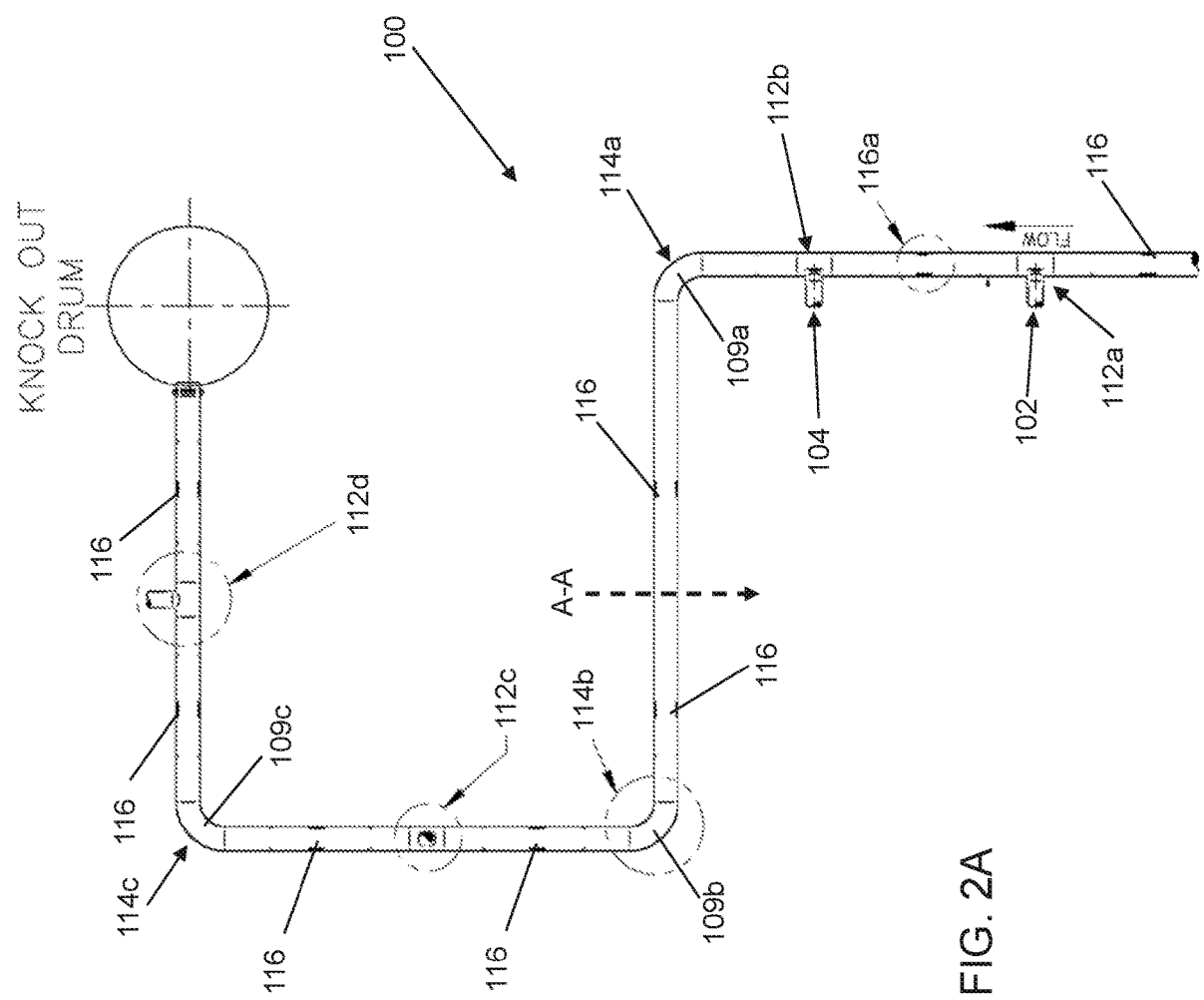

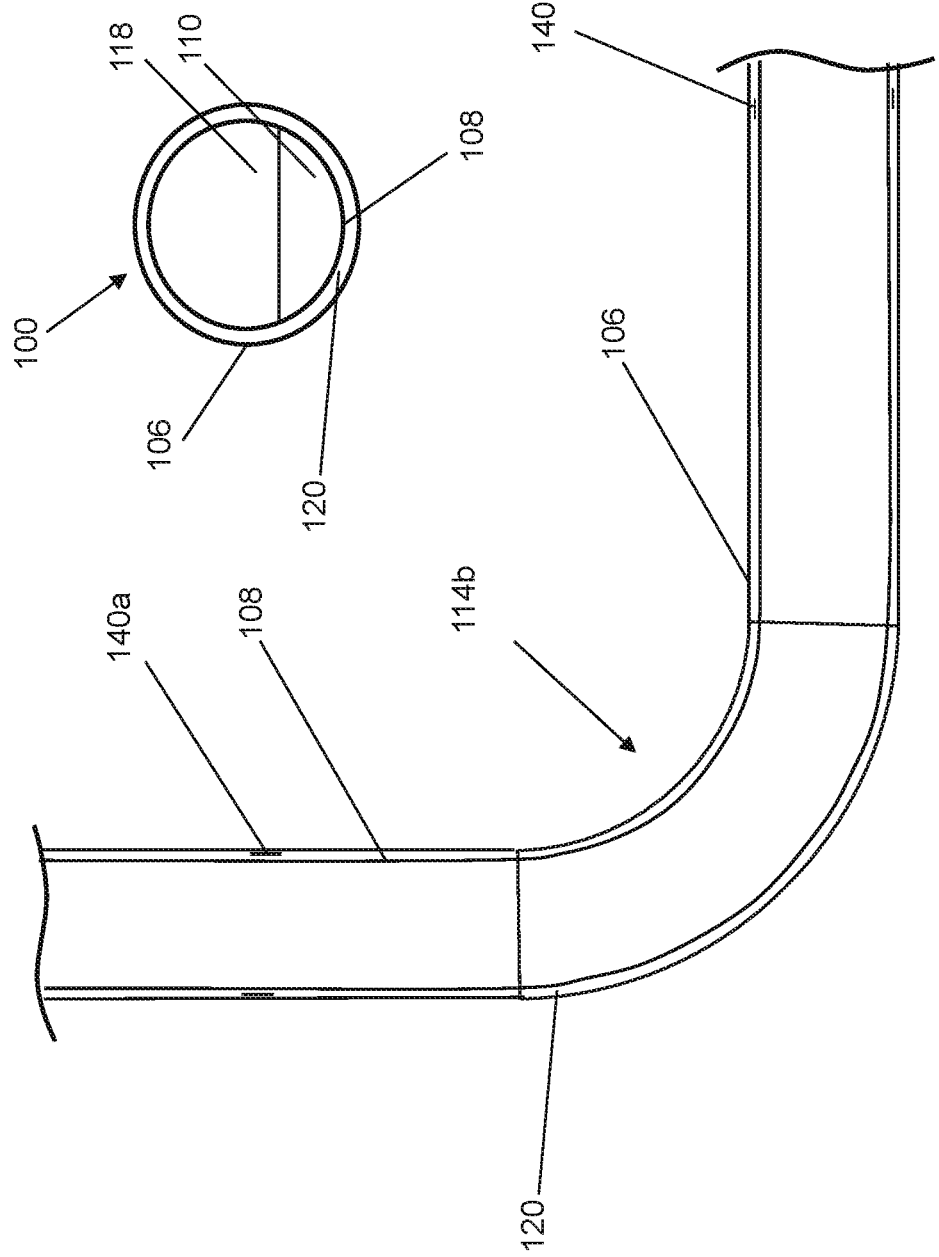

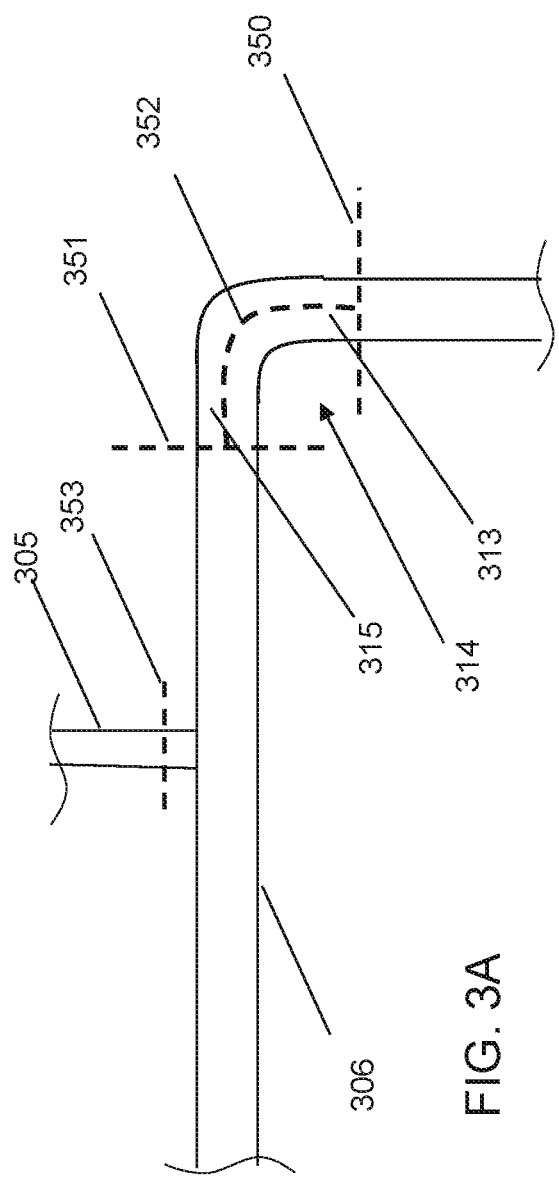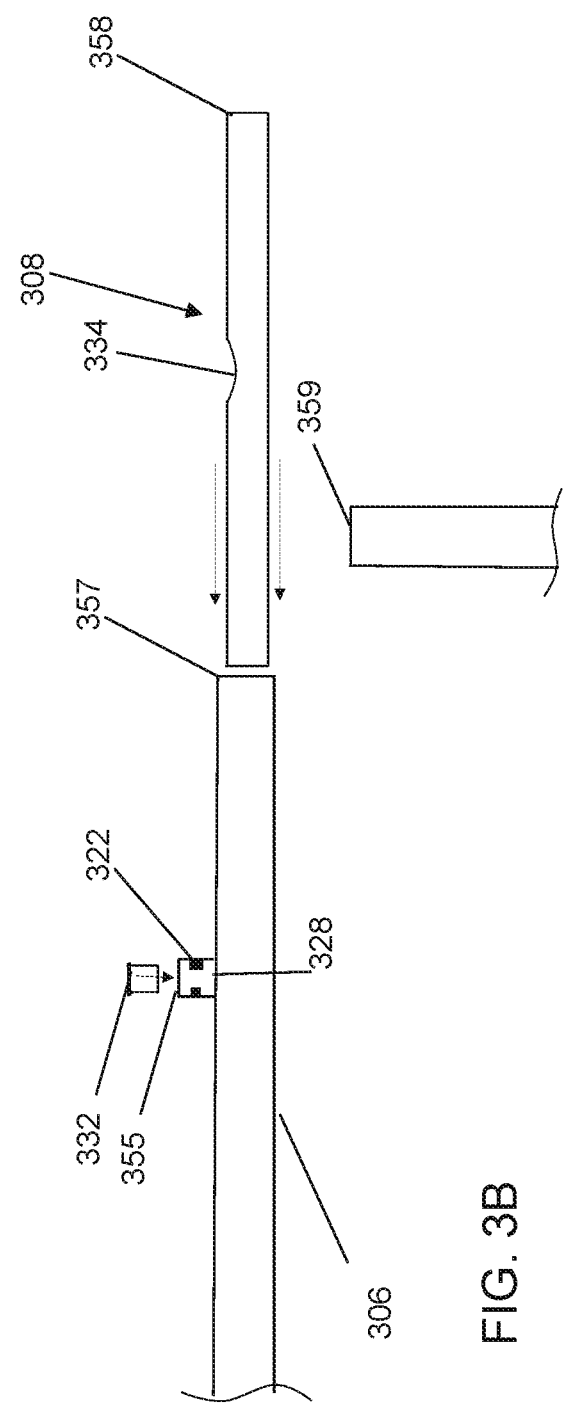
FIG. 3A
FIG. 3B

LINER FOR INSULATING HIGH TEMPERATURE PROCESS PIPING AGAINST THERMAL FATIGUE FAILURE

CROSS-REFERENCE TO RELATED APPLICATIONS

This application claims priority to Canadian Patent Application No. 3,060,620 filed on Oct. 28, 2019, entitled "Liner for Insulating High Temperature Process Piping Against Thermal Fatigue Failure", the entire contents of which is incorporated herein by reference.

TECHNICAL FIELD

The following generally relates to a liner for insulating high temperature process pipe against thermal fatigue failure and a method for installing such liner.

BACKGROUND

Thermal fatigue has long been recognized as a problem in pipe systems, particularly in pipe systems for high temperature processes including, but not limited to, delayed coking and nuclear power generation.

Low cycle thermal fatigue from, e.g., temperature changes between operation cycles, can generally be accounted for when designing pipe systems for a given process. Expansion joints can be placed between sections of pipe to accommodate for longitudinal expansion and contraction of same in response to temperature change, and thus can prevent pipe buckling. Commonly used expansion joints include expansion loops, bellows and slip joints. High cycle thermal fatigue, on the other hand, is often more difficult to predict, measure and mitigate.

High cycle thermal fatigue can result from high frequency applied thermal loading in mixing zones between hot and cold fluids, e.g., points local to mixing tees or near a stratification interface (i.e., interface between two fluids having different temperatures). The rapid temperature fluctuations can lead to local stresses in the pipe wall which can, in turn, result in crack initiation and propagation through the pipe wall. These rapid temperature fluctuations, or thermal transients, increase the rate of the heat transfer locally thereby generating high thermal stresses due to mechanical constraint effects inside the metal. If, in addition, corrosive process fluids are in contact with the pipe, structural weakening from corrosion can worsen the effects of the thermal stresses, particularly when the pipe has marginal corrosion resistance.

In horizontal sections of pipe, two or more streams of fluid having different temperatures can flow in separate layers without appreciable mixing, making long sections of such pipe susceptible to thermal stratification. Thermal stratification (i.e., a circumferential temperature gradient) can cause thermal shock loading in the pipe wall. Thermal stratification can be more pronounced at lower flow rates. Additionally, in horizontal and vertical lengths of pipe having relatively high flow rates, longitudinal thermal gradients can develop, which can also cause thermal shock loading in the pipe wall.

Manifestations of thermal loading such as those discussed above can lead to crack initiation at the inner surface of the pipe, and subsequent crack propagation through the pipe wall. The subject pipe can fail if the cracking becomes sufficiently severe.

Common methods of mitigating the cracking of process piping include weld overlay of the outside of pipe sections weakened by cracking, or fully replacing failed lines. These methods can be considerably expensive, and do not address the cracking itself.

It is an object of the following to address at least one of the above-noted issues or disadvantages.

SUMMARY

Provided herein is a liner that can be loosely inserted into a process pipe so as to decrease the rate of heat transfer between the process fluids flowing through the liner and the pipe, thereby reducing applied thermal loading on the pipe. This, in turn, can reduce or prevent cracking of the pipe.

In an aspect, provided herein is a liner adapted for installation within a pipe the liner sized to provide a gap between an outer wall of the liner and an inner wall of the pipe, the liner defining a channel adapted to convey a fluid therethrough and comprising a plurality of segments connected to one another by joints that permit movement of the segments relative to one another.

In an implementation of the liner, the liner comprises at least one spacer provided on the outer wall of the liner to maintain the gap.

In another implementation of the liner, the pipe has at least one bend, and one or more of the segments are adapted to line the at least one bend.

In yet another implementation of the liner, the pipe has at least one mixing tee, and one or more of the segments are adapted to line the at least one mixing tee.

In yet another implementation of the liner, the one or more segments adapted to line the at least one mixing tee have a hole defined therein and are adapted to be provided within a mixing portion of the at least one mixing tee, and said hole is aligned with the mixing portion of the at least one mixing tee.

In yet another implementation of the liner, the at least one spacer comprises a plurality of support rings provided on an outer circumference of the liner.

In yet another implementation of the liner, one or more of the joints are expansion joints.

In yet another implementation of the liner, one or more of the joints are configured to provide fluid communication between the channel and the gap.

In yet another implementation of the liner, one or more of the joints are sealed to prevent fluid communication between the channel and the gap.

In yet another implementation of the liner, the expansion joints are sealed using packing.

In yet another implementation of the liner, the expansion joints are slip joints.

In yet another implementation of the liner, the expansion joints are bellows type expansion joints.

In yet another implementation of the liner, the liner is made from a carbon steel.

In yet another implementation of the liner, the liner is made from a stainless steel.

In yet another implementation of the liner, the liner is made from a duplex steel.

In yet another implementation of the liner, the liner is made from a ferritic steel.

In yet another implementation of the liner, the liner is made from a nickel-based alloy.

In yet another implementation of the liner, the fluid comprises one or more of steam, steam condensate and hydrocarbons.

In yet another implementation of the liner, the gap creates an annulus.

In yet another implementation of the liner, the annulus is configured to accumulate coke or condensed water.

In another aspect, provided herein is a lined pipe comprising an outer pipe and a liner, the liner defining a channel adapted to convey a fluid therethrough and comprising a plurality of segments connected to one another by joints that permit movement of the segments relative to one another, the liner being sized to provide a gap between an outer wall of the liner and an inner wall of the outer pipe.

In an implementation of the lined pipe, the outer pipe has at least one bend, and one or more of the segments are adapted to line the at least one bend in the outer pipe.

In another implementation of the lined pipe, the outer pipe has at least one mixing tee and one or more of the segments are adapted to line the at least one mixing tee.

In yet another implementation of the lined pipe, the one or more segments adapted to line the at least one mixing tee have a hole defined therein and are provided within a mixing portion of the at least one mixing tee, and said hole is aligned with the mixing portion of the at least one mixing tee.

In yet another implementation of the lined pipe, the lined pipe further comprises at least one spacer provided on the outer wall of the liner to maintain the gap.

In yet another implementation of the lined pipe, the at least one spacer is a plurality of support rings provided on an outer circumference of the liner.

In yet another implementation of the lined pipe, one or more of the joints are expansion joints.

In yet another implementation of the lined pipe, one or more of the joints are configured to provide fluid communication between the channel and the gap.

In yet another implementation of the lined pipe, one or more of the joints are sealed to prevent fluid communication between the channel and the gap.

In yet another implementation of the lined pipe, the expansion joints are slip joints.

In yet another implementation of the lined pipe, the expansion joints are sealed using packing.

In yet another implementation of the lined pipe, the expansion joints are slip joints.

In yet another implementation of the lined pipe, the expansion joints are bellows type expansion joints.

In yet another implementation of the lined pipe, the liner is made from a carbon steel.

In yet another implementation of the lined pipe, the liner is made from a stainless steel.

In yet another implementation of the lined pipe, the liner is made from a duplex steel.

In yet another implementation of the lined pipe, the liner is made from a ferritic steel.

In yet another implementation of the lined pipe, the liner is made from a nickel-based alloy.

In yet another implementation of the lined pipe, the outer pipe is made from a carbon steel.

In yet another implementation of the lined pipe, the gap creates an annulus.

In yet another implementation of the lined pipe, the annulus is configured to accumulate coke or condensed water.

In yet another implementation of the lined pipe, the fluid comprises one or more of steam, steam condensate and hydrocarbons.

In yet another aspect, provided herein is a method of reducing a rate of heat transfer between a fluid and a metal pipe having a bend, the method comprising: cutting the pipe at each end of the bend to remove the bend and to create first and second open ends in the pipe; inserting a first straight liner segment into the first open end; inserting a second straight liner segment into the second open end; welding one end of a liner bend segment to the first straight liner segment, the liner bend segment being adapted to line the bend; welding another end of the liner bend segment to the second straight liner segment; cutting the bend along a longitudinal axis thereof to create two outer pipe halves; and welding the two halves together around the liner bend segment and to the first and second open ends to create a lined metal pipe, the lined metal pipe being adapted to convey the fluid therethrough.

In an implementation of the method, the liner segments are made from a carbon steel.

In another implementation of the method, the liner segments are made from a stainless steel.

In yet another implementation of the method, the liner segments are made from a duplex steel.

In yet another implementation of the method, the liner segments are made from a ferritic steel.

In yet another implementation of the method, the liner segments are made from a nickel-based alloy.

In yet another implementation of the method, the metal pipe is made from a carbon steel.

In yet another implementation of the method, the fluid comprises one or more of steam, steam condensate and hydrocarbons.

BRIEF DESCRIPTION OF THE DRAWINGS

Embodiments will now be described with reference to the appended drawings wherein:

FIG. 2A is a schematic view of a lined coker blowdown header.

FIG. 2B is a cross-sectional view of the lined coker blowdown header taken along line A-A shown in FIG. 2A.

FIG. 2C is an expanded view of a lined elbow shown in FIG. 2A.

FIG. 3A is a schematic view of pipe showing retrofitting cut lines.

FIG. 3B is a schematic view showing a method of lining the pipe of FIG. 3A.

DETAILED DESCRIPTION

One or more of the terms "vertical", "vertically", "horizontal", "horizontally", "top", "bottom", "upwardly", "downwardly", "upper" and "lower" are used throughout this specification. It will be understood that these terms are not intended to be limiting. These terms are used for convenience and to aid in describing the features herein, for instance, as illustrated in the accompanying drawings.

Provided herein is a liner that can be loosely inserted in process pipe so as to decrease the rate of heat transfer between the process fluids flowing through the liner and the process pipe. The liner provided herein can reduce applied thermal loading on the outer pipe resulting from, for example, turbulent mixing between fluids having different temperatures (with or without stratification), circumferential thermal gradients, and/or longitudinal thermal gradients. This, in turn, can reduce or prevent cracking of the outer pipe.

An example embodiment of the liner discussed below is shown in the context of a delayed coking process; however, the loose-fitting liner provided herein can be used in other processes to extend the lifetime of pipe subjected to stresses from thermal loading and/or corrosion.

Delayed coking is a common process for refining heavy oil or bitumen heavy ends from vacuum distillation (i.e., residue) through carbon rejection as coke. In a typical delayed coking process, a residue feed is introduced to a fractionator after being pre-heated with coker gas oil products. The bottoms from the fractionator are mixed with steam and sent to a furnace to create a heated coker drum feed. The heated coker drum feed exits the furnace to be introduced into the bottom of one of two or more coke drums. As the coke drum slowly fills, coking takes place therein. Hot product vapors and steam can exit the top of the coke drum and travel down overhead vapor lines to the fractionator. At the same time, other coke drums go through steaming, water quenching or back warming operations, thereby producing effluent including steam, steam condensate, hydrocarbon vapor and condensate of a wide range of temperatures. A coker blowdown header conveys such effluent to the knockout drum. The blowdown header can therefore be subjected to severe cyclic temperature fluctuations as fluids of varying temperatures mix within the header.

Figure 1B:
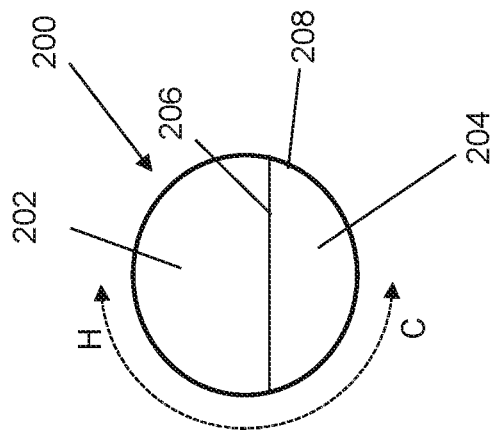
FIG. 1B is a cross-sectional view of the prior art coker blowdown header taken along line A-A shown in FIG. 1A.
Figure 1A:
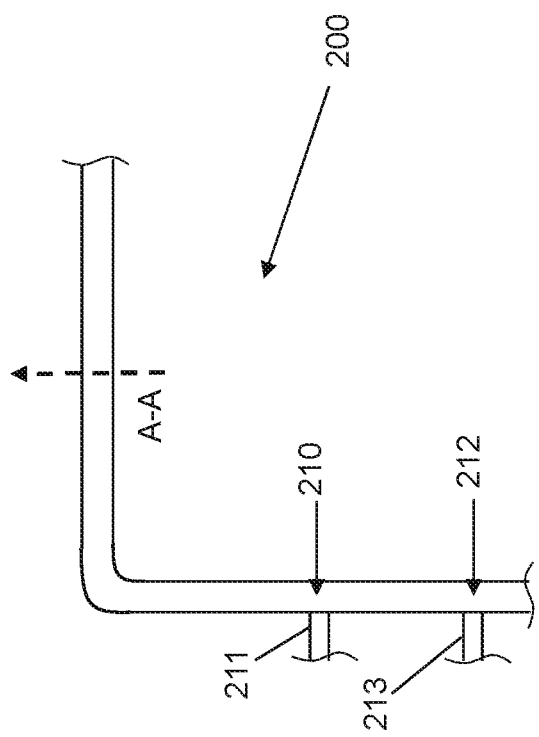
FIG. 1A is a schematic view of a prior art coker blowdown header.

FIGS. 1A and 1B are schematic and cross-sectional views, respectively, of a section of a typical blowdown header 200. As noted, high-temperature steam from a coker drum can partially condense prior to entering the header 200, while the liquid hydrocarbon or steam condensate leaving other coker drums is considerably colder and can enter the header 200 in the liquid phase. The liquid can collect at the bottom of the header, forming a pool 204. A portion of the hydrocarbons entering the header 200 can condense while flowing over the pool 204 and collect therein. A vapor layer 202, overlying the pool 204, comprises any remaining gaseous hydrocarbons and unsaturated steam. A dashed, curved arrow is depicted in FIG. 2 to illustrate a circumferential temperature gradient which can develop from such pooling, where labels "H" and "C" indicate relatively hotter and colder points, respectively, along the circumference of the header 200. In the embodiment shown, the blowdown header 200 can be directly subjected to thermal shock caused by the thermal stratification (i.e., the header 200 can also expand and contract by varying amounts along the axial direction thereof). Additionally, turbulent flow can occur at the interface 206 between the vapor layer 202 and the pool 204. This, in turn, can cause high frequency applied thermal loading at points along the inner surface 208 of the header 200 local to the interface 206. Such high frequency applied thermal loading can also occur at mixing points 210 and 212, where steam from another coker downcomer 211 and hydrocarbon liquid from another coke drum downcomer 213, respectively, can mix with fluid present in the header 200. The thermal stratification and/or thermal loading from turbulent flow can result in the initiation of cracks in the inner surface 208, which can propagate radially through the header 200.

Turning to FIG. 2A, depicted is an example embodiment of a loosely lined coker blowdown header 100. The blowdown header 100 can have a relatively low slope (i.e., can be substantially horizontal); therefore, pooling can occur therein. The blowdown header 100 comprises an outer pipe 106 and a liner 108 provided preferably coaxially within the outer pipe 106. Preferably, direct contact between the liner 108 and the outer pipe 106 is inhibited or otherwise reduced or minimized. This can be done by, for example, placing a plurality of spacers, at a pre-determined distance from one another, between the liner 108 and the outer pipe 106 (FIG. 2C). An annulus 120 can thus be maintained between the outer pipe 106 and the liner 108 (FIG. 2B).

As shown in FIG. 2A, the blowdown header 100 in the example shown includes first, second, third and fourth mixing tees 112a, 112b, 112c and 112d, respectively. A coke drum downcomer 102 can feed high temperature steam into the first mixing tee 112a, mixing with fluid already in the blowdown header. Another coke drum downcomer 104 can feed steam condensate or liquid hydrocarbons into the second mixing tee 112b. The steam and hydrocarbon fluid mixture can be referred to hereinafter as "blowdown fluid". The mixing tees 112 are discussed in greater detail with respect to FIG. 2E.

The liner 108 comprises a plurality of segments (108a, 108b, etc.) connected to one another by expansion joints 116. One of the expansion joints 116 is discussed in greater detail with respect to FIG. 2D. In the example embodiment shown, the expansion joints 116 are slip joints. The liner 108 further comprises bend sections 109a, 109b, and 109c, adapted to line bends 114a, 114b and 114c, respectively, in the outer pipe 106.

Figure 2D:
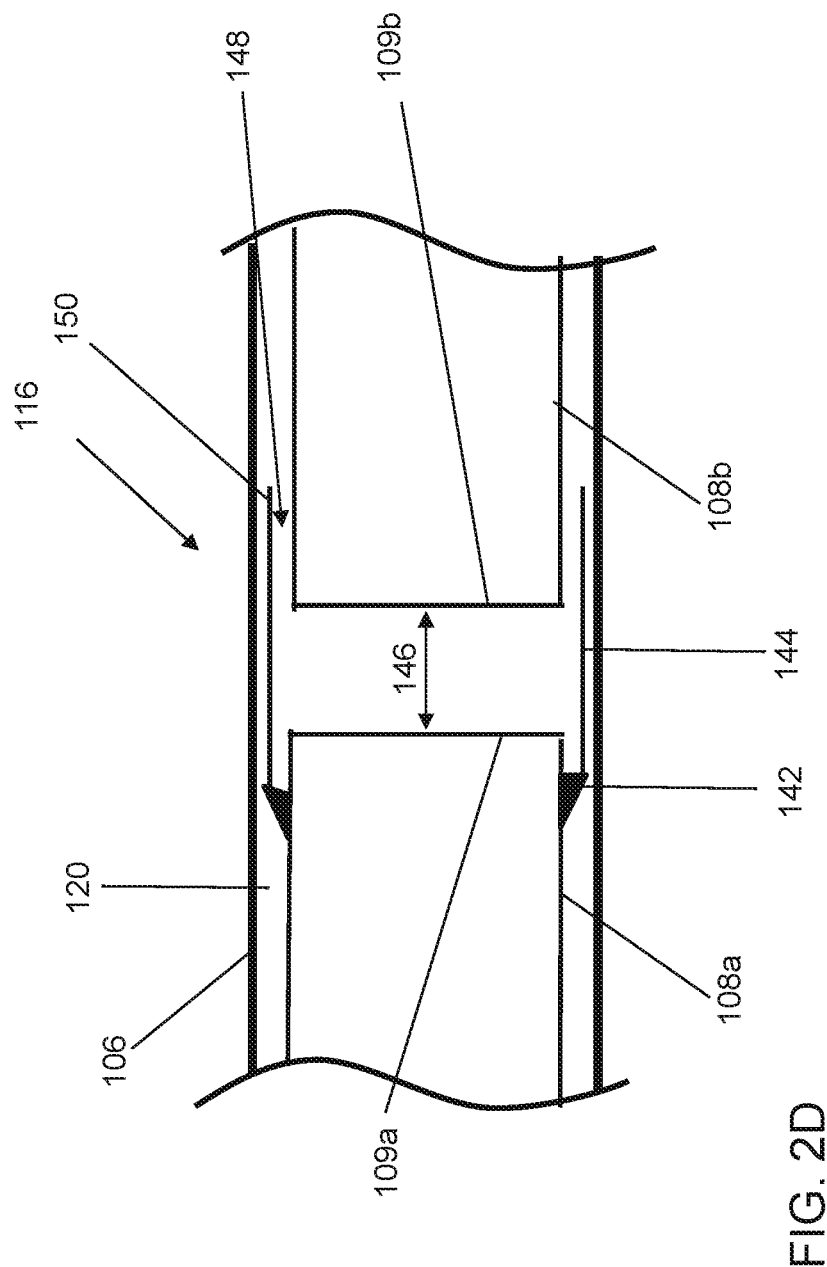
FIG. 2D is an expanded, longitudinal cross-sectional view of an expansion joint shown in FIG. 2A.

It can be appreciated that piping used in processes, such as delayed coking, which do not involve highly corrosive fluids, is generally made from carbon steel. Other alloys such as duplex steels, super-duplex steels and nickel-based alloy steels are more corrosion resistant and stronger than carbon steel normally used in process pipe, but can be cost prohibitive. Moreover, some of these alloys can be susceptible to environmental cracking in the coker blowdown line environment Thus, returning to FIG. 2B, the liner 108 can be made from a carbon steel or stainless steel, although the liner 108 can be made from other metals such as duplex steels, ferritic steels or nickel-based alloy steels. The liner 108 can have a smaller diameter than the outer pipe 106, hence the formation of the annulus 120. As discussed above, the annulus 120 can be maintained by placing spacers between the liner 108 and the outer pipe 106. In FIG. 2C, two spacers, namely intermediate support rings 140a and 140b, are disposed circumferentially about the liner 108. The liner 208 can crack from being subjected to circumferential and/or longitudinal temperature gradients and high frequency thermal cycling. In this example embodiment, such cracking is permissible since the presence of header fluid in the annulus 120 is unlikely to appreciably corrode the carbon steel outer pipe 106. The header fluid can also leak out of the liner 108 through one or more of the expansion joints 116 (FIG. 2D). It may be that as the header fluid leaks into the annulus 120, a substantial portion or all of the fluid condenses due to the lower temperature of the outer pipe 106, and thus can form a liquid thermal buffer between the liner 108 and the pipe 106, which can grow until the annulus 120 is filled. Therefore, the annulus 120 can be at least partially filled with condensed header fluid. The condensed header fluid can further reduce the rate of heat transfer between the hotter blowdown fluid and the outer pipe 106 to prevent or reduce cracking of the outer pipe 106.

In the delayed coking environment, the annulus 120 can also eventually be filled with solids such as heavy hydrocarbon residue and coke. The deposition of these solids within the annulus can form a permanent, thermally resistant barrier that can, along with the liner 108, protect the blowdown pipe 106 from thermal heating and thermal quenching damage. It can be appreciated that the annulus 120 can be filled or partially filled with a combination of condensed fluids, such as condensed water, and carbonaceous solids such as coke.

It can be appreciated that other processes in which piping is subjected to similar conditions can benefit from the principles discussed herein. For example, when using the liner of the present disclosure in a process involving fluids comprising water, the formation of a thermal buffer of condensed water within the annulus can further reduce the rate of heat transfer from fluids in the liner toward the outer pipe. One of such processes is nuclear power generation, where cracking of piping has been shown to be caused by thermal stratification and/or high frequency applied thermal loading at mixing points. It can also be appreciated that when significantly hotter process fluids are involved, the annulus can still reduce thermal shock experienced by the outer pipe since, e.g., air, gaseous process fluids and/or inert gases in the annulus can retard the rate of heat transfer. Moreover, the maintenance of such an annulus can inhibit, reduce, or otherwise minimize contact between the liner and the outer pipe, thereby reducing the rate of thermal conduction therebetween.

FIG. 2D illustrates one of the expansion joints 116 which can allow movement between liner segments 108a and 108b. The expansion joints 116 can be provided to prevent buckling of the liner 108 as a result of longitudinal thermal expansion and contraction thereof. The expansion joint 116 includes a sleeve 144 of larger diameter than either of the liner segments 108a and 108b, which can be welded to the liner segment 108a by way of a fillet weld 142. The sleeve 144 includes an opening 150 into which the liner segment 108b can extend and move axially within the sleeve 144. It can be appreciated that the sleeve 144 can be welded to either one of the liner segments 108a and 108b, and that other types of weld can be used to connect the sleeve 144 to the liner segment 108a, 108b. As shown, there can be a gap 146 between opposing, open ends 109a and 109b of the liner segments 108a and 108b, respectively. The gap 146 can allow the ends 109a and 109b to approach one another as the liner segments 108a and 108b expand as the temperature increases. The sleeve 144 can be of such a length that the open end of the liner segment 109b can remain therein as the segments 108a and 108b cool to an expected minimum process temperature (i.e. as the gap 146 increases to a maximum size). Since the sleeve 144 is of larger diameter than the liner segment 108b, header fluid flowing into the gap 146 and between the open ends 109a and 109b can pass through an annular space 148 between the sleeve and the liner segment 108b and subsequently enter the annulus 120.

It can be appreciated that the liner 108 can be modified for use in a process involving corrosive fluids such that little or no corrosive fluids leaks from the liner 108 into the annulus 120. In such an embodiment, the liner 108 can be made from a corrosion-resistant metal such as an austenitic stainless steel, duplex, superduplex alloys, nickel based alloy, copper based alloys and non-ferrous alloys. Additionally, a sealed expansion joint can be used such as, e.g., a bellows type expansion joint. In an embodiment of the liner 108 wherein a bellows type expansion joint is used, the sleeve 144 can be a corrugated metal sleeve that is welded to both liner segments 108a and 108b so as to prevent process fluids from leaking into the annulus 120. Optionally, a slip joint can be used that can be sealed by incorporating rope-type packing therein, such as graphite packing, in the conventional manner.

Figure 2E:
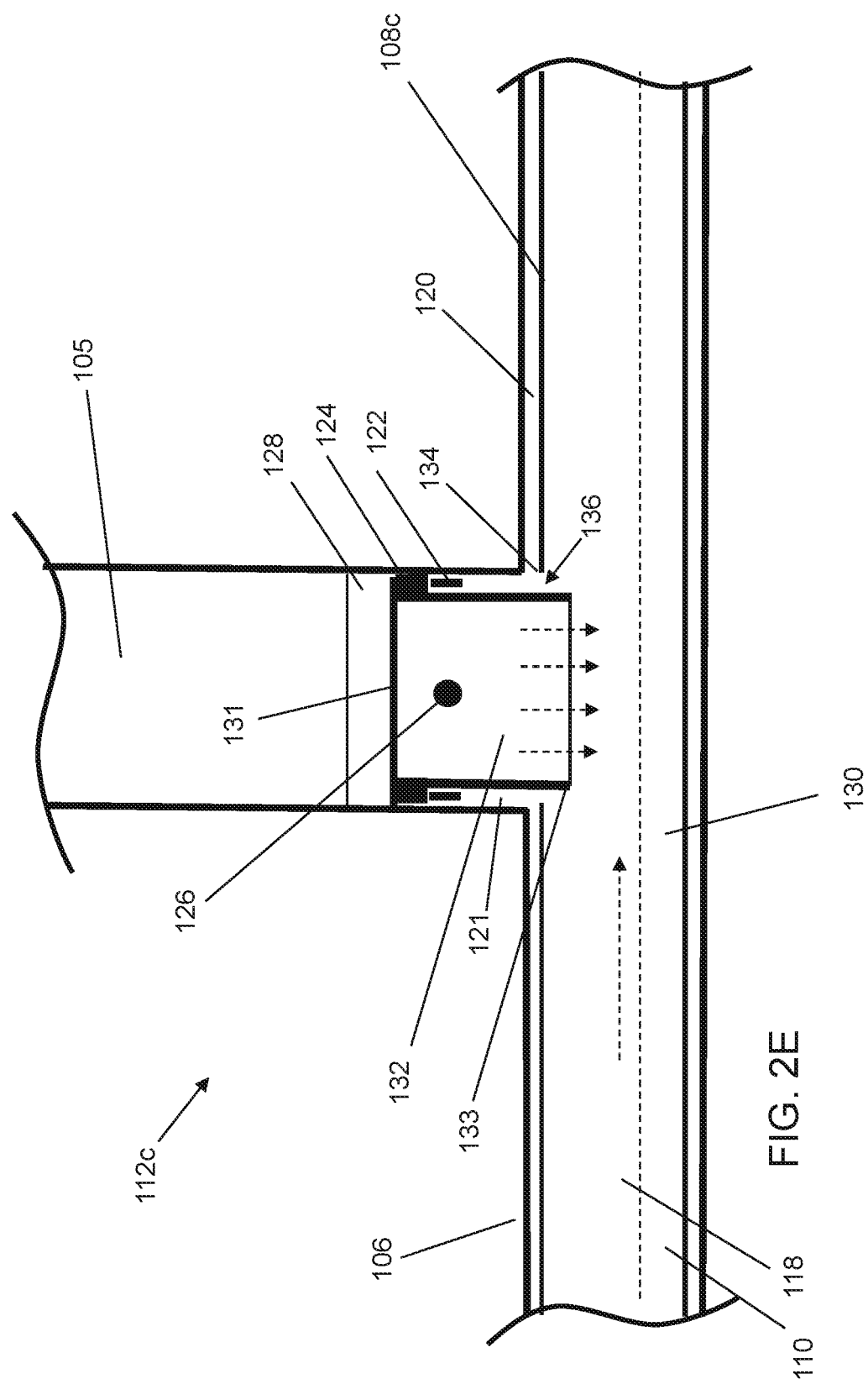
FIG. 2E is an expanded, longitudinal cross-sectional view of a lined mixing tee shown in FIG. 2A.

FIG. 2E is an expanded view of the lined mixing tee 112c shown in FIG. 1A. The lined mixing tee 112c includes an injection portion 128, which is part of a coker downcomer line 105 (not shown in FIG. 2A), and a mixing portion 130 which is part of the outer pipe 106. A liner segment 108c having a hole 134 defined therein is provided within the mixing portion 130. A nozzle liner 132 having a first end 131 and a second end 133 can be provided within the injection portion 128. The first end 131 of the nozzle liner 132 includes a lip, or collar 124 which can be received and supported by a hook 122 provided within the injection portion 128. Preferably, the nozzle liner 132 is plug welded (at a point 126) to the inside of the injection portion 128 to prevent fretting damage of the hook 122 by the collar 124 as the liner 132 is subjected to the turbulent environment. The second end 133 of the nozzle liner 132 is slidably received within the hole 134, thereby allowing the liner 132 to move with respect to the liner segment 108c as the injection portion 128 (to which the liner 132 is welded) and line 105 thermally expand and contract. Thus, a space 136 can exist between the surface defining the hole 134 and the nozzle 132. As a result, the header fluid can leak out of the space 136 into the annulus 120 and a minor annulus 121 can form between the nozzle liner 132 and the injection portion 128. A considerably hot fluid such as hydrocarbon vapor from a coker drum can flow from the line 105, through the injection portion 128, into the liner 132 and into the liner 108c within the mixing portion 130, where the hot fluid can mix with colder blowdown fluid (i.e., liquid pool 110 and overlying vapor portion 118), thereby subjecting the liner segment 108c and the nozzle liner 132 to high frequency thermal fatigue. Similar to the annulus 120, the minor annulus 121 can be partially or completely filled with header fluid, thereby creating a thermal buffer between the hotter header fluid within the liner 132 and the injection portion 128, preventing or reducing cracking of the injection portion 128 which can be made from the same material as the outer pipe 106. The nozzle liner 132 can be made of the same material as the liner 108.

In another example embodiment wherein the liner 108 is used in a process involving corrosive fluids, the space 136 can be minimized or eliminated to prevent fluid leakage into the annulus 120.

Returning to FIG. 2C, illustrated is an expanded view of the elbow 114b in the blowdown header 100. As noted above, the intermediate support rings 140a and 140b can be provided between the liner 108 and the outer pipe 106 to maintain the annulus 120. The elbows 114 can be lined using the method discussed further below.

Figure 3C:
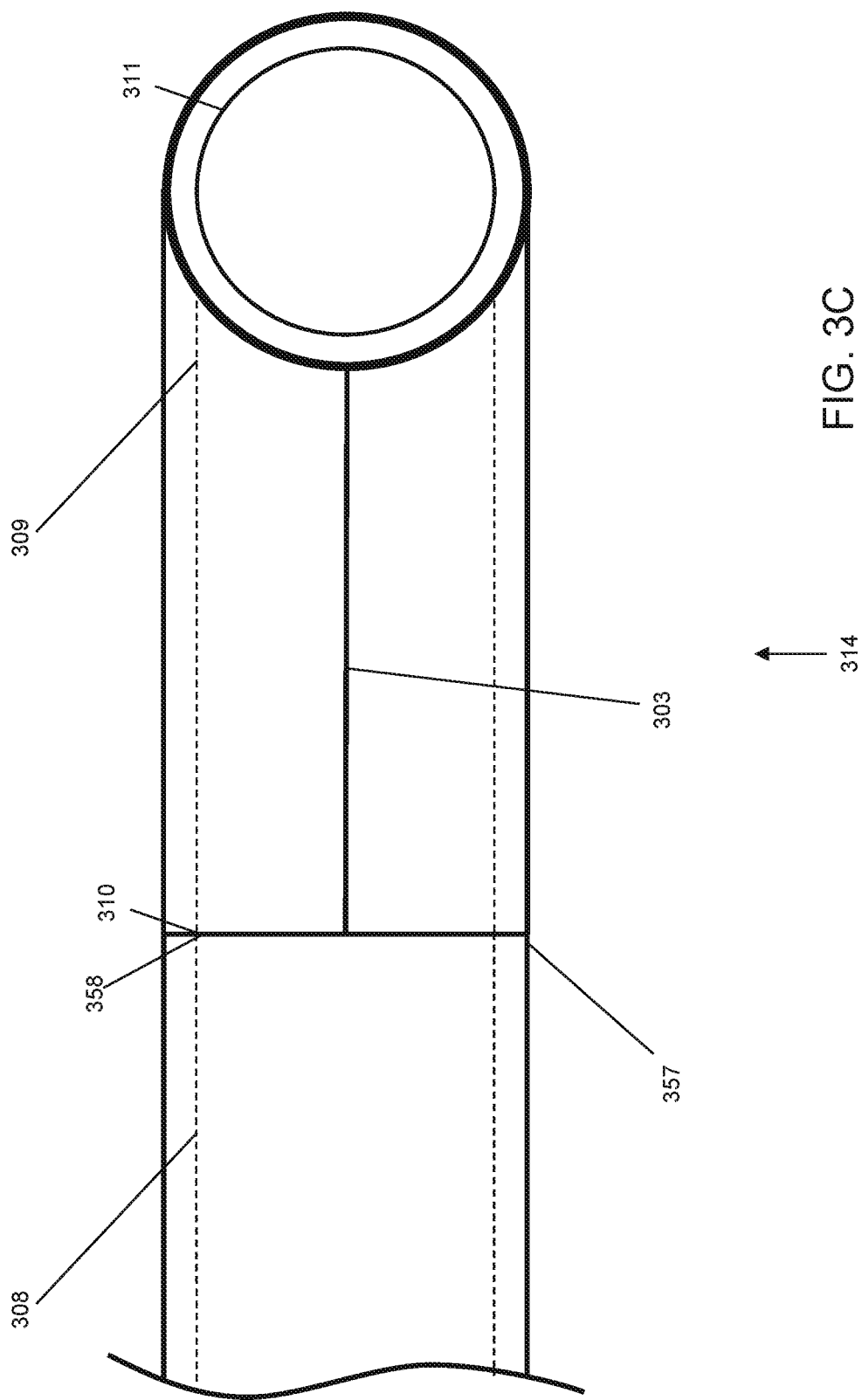
FIG. 3C is a front view of the pipe shown in FIG. 3A, wherein the pipe is partially lined.

FIG. 3A is a schematic view of a carbon steel pipe 306 section prior to being lined. Lining the pipe 306 can be done by sequentially inserting segments of a liner 308. The pipe 306 can be cut along cut lines 351 and 350 to remove an elbow 314, leaving open ends 357 and 359. A coker downcomer nozzle 305 connecting to the pipe 306 can be cut along a cut line 353, leaving open end 355. The removed elbow 314 can subsequently be cut along a curved cut line 352 to create two halves 313 and 315. Turning to FIG. 3B, a liner segment 308 having an opening 334 therein can be inserted into the open end 357. A nozzle liner 332 similar to that discussed further above can then be inserted into the open end 355 and into the opening 334. The nozzle liner 332 can be plug welded to a section of remaining line 328. Next, an end 358 of the liner 308 extending out of the opening 357 can be welded to one end 310 of a liner bend segment 309 (FIG. 3C). Another end 311 of the liner bend segment 309 can be welded to a corresponding end of another liner segment (not shown). The halves 313 and 315 can then be welded together around the liner bend segment 309 and subsequently welded to the open ends 357 and 359 (not shown). In some situations, the halves 313 and 315 and elbow liner can be co-stamped together in, e.g., an elbow fabricator shop, thereby eliminating the curved cut line 352. It can be appreciated that variations of the above discussed method for lining a process pipe with the liner provided herein are possible within the principles discussed herein.

It will be understood that the annulus described above is one possible type of gap between the liner and the outer pipe. Depending on factors including, but not limited to, whether spacers are used to maintain the gap, the type of spacers used, and the orientation of the outer pipe (i.e., horizontal with respect to the ground, vertical, etc.), the distribution and uniformity of the gap formed between the liner and the outer pipe can vary.

Although the above discussion is directed to metal liners for use in high temperature processes, it can be appreciated that the liner can also be made from other materials such as plastic. However, plastics used to make the liner may not be able to withstand extremely high operating temperatures such as those seen in, e.g. delayed coking. Thus, plastic could be useful in a process involving corrosive fluids and operating temperatures low enough to avoid damaging the plastic.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

The examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A liner adapted for installation within a pipe, the liner sized to provide a gap between an outer wall of the liner and an inner wall of the pipe, the liner defining a channel adapted to convey a fluid therethrough and comprising a plurality of segments connected to one another by joints that permit movement of the segments relative to one another, wherein the liner is configured to provide fluid communication between the channel and the gap, and wherein fluid entering the gap forms a thermal buffer between the outer wall of the liner and the inner wall of the pipe, the fluid forming the thermal buffer extending substantially along the length of the pipe.

2. The liner of claim 1, further comprising at least one spacer provided on the outer wall of the liner to maintain the gap.

3. The liner of claim 2, wherein the at least one spacer comprises a plurality of support rings provided on an outer circumference of the liner.

4. The liner of claim 1, wherein the pipe has at least one bend, and one or more of the segments are adapted to line the at least one bend.

5. The liner of claim 1, wherein one or more of the joints are configured to provide fluid communication between the channel and the gap.

6. The liner of claim 1, wherein the one or more of the joints are slip joints.

7. The liner of claim 1, wherein the one or more joints are bellows type expansion joints.

8. The liner of claim 1, wherein the pipe has at least one mixing tee, and one or more of the segments are adapted to line the at least one mixing tee.

9. The liner of claim 8 wherein the one or more segments adapted to line the at least one mixing tee have a hole defined therein and are adapted to be provided within a mixing portion of the at least one mixing tee, and said hole is aligned with the mixing portion of the at least one mixing tee.

10. The liner of claim 1 wherein the gap defines an annulus configured to accumulate coke or condensed water.

11. A lined pipe comprising an outer pipe and a liner, the liner defining a channel adapted to convey a fluid therethrough and comprising a plurality of segments connected to one another by joints that permit movement of the segments relative to one another, the liner being sized to provide a gap between an outer wall of the liner and an inner wall of the outer pipe, wherein the liner is configured to provide fluid communication between the channel and the gap, and wherein fluid entering the gap forms a thermal buffer between the outer wall of the liner and the inner wall of the pipe, the fluid forming the thermal buffer extending substantially along the length of the pipe.

12. The lined pipe of claim 11, wherein the outer pipe has at least one bend, and one or more of the segments are adapted to line the at least one bend in the outer pipe.

13. The lined pipe of claim 11, further comprising at least one spacer provided on the outer wall of the liner to maintain the gap.

14. The lined pipe of claim 13, wherein the at least one spacer comprises a plurality of support rings provided on an outer circumference of the liner.

15. The lined pipe of claim 11, wherein one or more of the joints are configured to provide fluid communication between the channel and the gap.

16. The lined pipe of claim 11, wherein the expansion joints are slip joints.

17. The lined pipe of claim 11, wherein the one or more joints are bellows type expansion joints.

18. The lined pipe of claim 11, wherein the outer pipe has at least one mixing tee and one or more of the segments are adapted to line the at least one mixing tee.

19. The lined pipe of claim 18 wherein the one or more segments adapted to line the at least one mixing tee have a hole defined therein and are provided within a mixing portion of the at least one mixing tee, and said hole is aligned with the mixing portion of the at least one mixing tee.

20. The lined pipe of claim 11 wherein the gap defines an annulus configured to accumulate coke or condensed water.

\* \* \* \* \*